July 11, 1944.  M. T. KNUTZEN  2,353,246

CONTROL MEANS FOR POWER OPERATED MACHINERY

Filed May 7, 1943  3 Sheets-Sheet 1

INVENTOR
M. T KNUTZEN
BY
ATTYS

INVENTOR
M. T. KNUTZEN
BY
ATT'YS

July 11, 1944. M. T. KNUTZEN 2,353,246
CONTROL MEANS FOR POWER OPERATED MACHINERY
Filed May 7, 1943 3 Sheets-Sheet 3

INVENTOR
M.T. KNUTZEN

BY
ATTYS

Patented July 11, 1944

2,353,246

UNITED STATES PATENT OFFICE 2,353,246

CONTROL MEANS FOR POWER-OPERATED MACHINERY

Max T. Knutzen, Dundas, Ontario, Canada, assignor to The John Bertram & Sons Co. Limited, Dundas, Ontario, Canada, a company of Canada Application May 7, 1943, Serial No. 485,964

7 Claims. (Cl. 192—15)

This invention relates to control means for power operated machinery such as mine hoists.

The invention will be illustrated by reference to its application to mine hoists but it is to be understood that such control means is applicable in other fields.

In power operated hoists for mines it is common practice to operate the brakes therefor by means of fluid pressure, i. e., oil or air, which is applied through a suitable thrust cylinder and under control of a control valve unit feeding the fluid medium to or releasing it from the thrust cylinder, brake application being effected by release of the pressure in the thrust cylinder, the piston of which is actuated by means of weights to apply the brakes on release of the fluid pressure.

It has also been the practice to employ with such mechanism a safety controller such as the well known "Lilly controller" which responds to overspeed and overwind, to deenergize a solenoid operatively associated with the control valve unit which automatically vents the thrust cylinder irrespective of the setting of the normal operating valve of the control unit and thus operates to apply the brakes in the case of any such emergency. It has been usual also to employ with such mechanism a clutch operating mechanism for engaging or disengaging the clutch between the shaft and the drum, such mechanism being so controlled that the clutch may not be disengaged from the drum until the brakes have been operated to fully applied position.

The present invention has to do with control mechanism which may be applied to hoists in the above mentioned manner or to other power operated devices which require control of this nature and whereas it employs the principles of such prior devices, it avoids disadvantages of the latter. On the one hand, in such prior devices it was possible to disengage the clutch prior to actuation of the brake to full braking position for the reason that the clutch mechanism was actuatable simultaneously with deenergization of the solenoid controlling the emergency valve of the control valve unit and if such unit acted sluggishly the clutch could be released before brake application.

The prior proposal furthermore involved some complication in its mechanism requiring very careful adjustment at various points to make certain that the mechanism would function accurately as required and the present invention seeks to overcome such complication as well as to eliminate the possibility of operation of the clutch until the brake has been applied to its full "on" position.

It is, therefore, an object of the present invention to provide control means for power operated mechanism such as hoists and the like including positive means for maintaining a clutch or other element in a predetermined setting until the brake or other element has been operated to accomplish the results desired of it.

A further object of the invention is to provide hydraulic means in combination with control means of the character referred to for positively maintaining the mechanism for disengaging the clutch or other element in a predetermined setting prior to full application of the brake or other element of power operated mechanism.

With these and other objects in view, the invention generally comprises a control means including a fluid operated thrust cylinder, a control valve unit therefor, operable manually or automatically in the case of emergency, and connecting means for operating a brake or other element to control power driven mechanism wherein the thrust cylinder unit, and control valve unit cooperating therewith, are of generally simplified construction. Associated with such mechanism is a second thrust cylinder for actuating a clutch or other element of power driven mechanism and operatively co-related, through the fluid medium operating the first thrust cylinder, for positively preventing the operation of the second thrust cylinder until the first has performed its complete function either as a result of actuation by automatic emergency mechanism or manual control mechanism.

Figure 1:
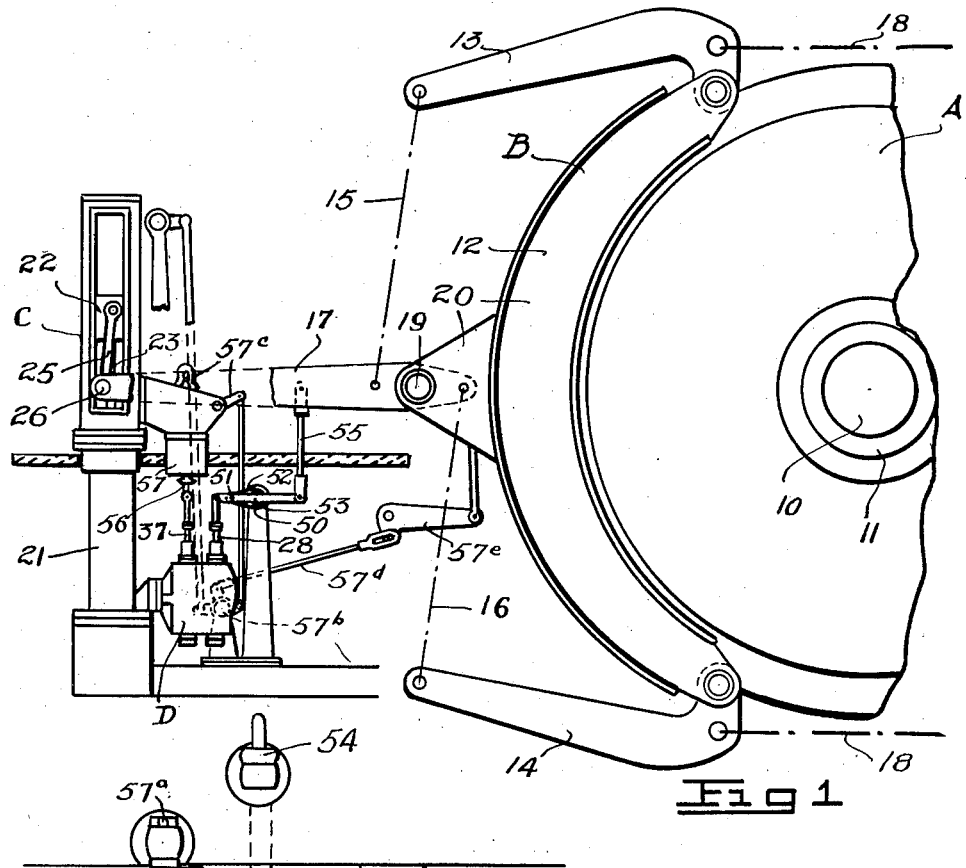
Fig. 1 is a diagrammatic elevation of control mechanism according to the present invention illustrating the general association of a thrust cylinder of control mechanism with the brakes of a hoist for their operation as required.
Figure 2:
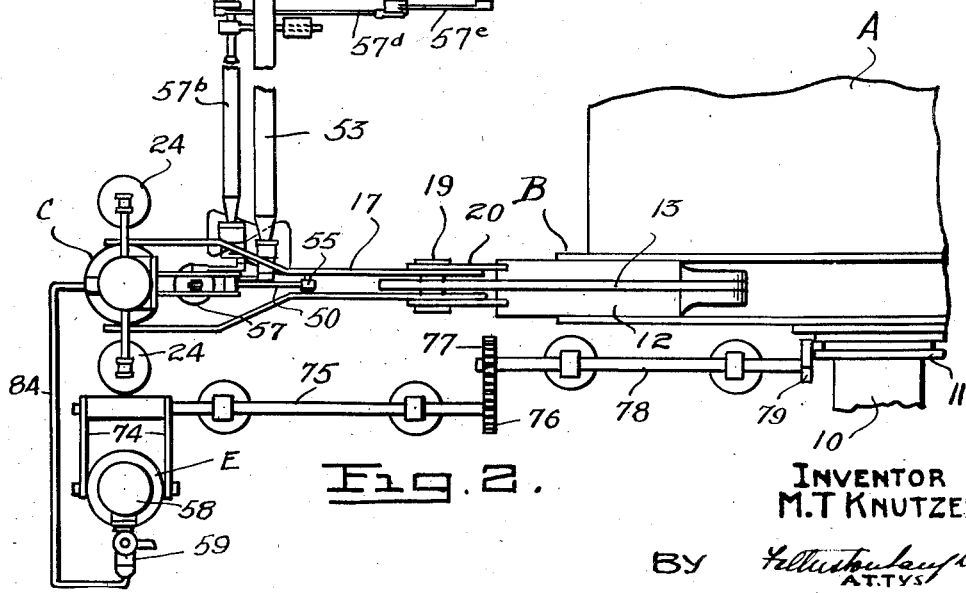
Fig. 2 is a plan view of Fig. 1 illustrating general positions of parts of the mechanism and illustrating in addition the association of a second thrust cylinder with that illustrated in Fig. 1 for the operation of the clutch of the hoist.

Referring to the drawings, and first of all to Figs. 1 and 2, A indicates a hoist drum mounted on a shaft 10 driven from any suitable source of power to rotate the drum. The drum is coupled to the shaft 10 by means of a suitable clutch 11. Associated with the hoist drum is brake mechanism B which includes brakes 12 designed to be disposed on each side of the drum in opposed relation (one side not illustrated) the brakes being operated through the levers 13 and 14 which connect through suitable link structure illustrated by the dotted lines 15 and 16 with the main brake operating lever 17. The levers 13 and 14 are link connected beyond their points of fulcrum with the opposite brake, the link connection being illustrated by the dotted lines 18.

The main brake operating lever is fulcrumed as at 19 on suitable brackets 20 and the links 15 and 16 connect with this main lever on opposite sides of the fulcrum 12 so that if the main brake lever 17 is swung downwardly, the brakes will be applied to the drum from each side with increasing pressure.

The main brake operating lever 17 is controlled by the unit C which comprises a thrust cylinder 21 having a piston therewithin which is raised by fluid pressure which operates the cross head 22 connected with the rod 23 of the piston, the latter being lowered by gravity through weights such as 24 (see Fig. 2) which are connected with the cross head 22. The fluid for raising the piston is passed to the cylinder 21 by means of the fluid control valve unit D, the operation of which will be dealt with in detail hereinafter.

The cross head 22 is connected with the main brake operating lever 17 by means of the link connection 25 which pivotally connects as at 26 with the free end of lever 17. Thus, if the piston within cylinder 21 is lowered by release of fluid pressure thereunder, the main brake operating lever will through the links 15 and 16, levers 13 and 14, and link connections 18 apply the brakes to the drum A. Conversely, when the fluid pressure is again applied beneath the piston and it is raised to position the brake lever 17 in normal position shown in Fig. 1, the brakes will be fully released so that the drum may be rotated.

In the prior type of unit the cylinder and piston were located at the upper end of the unit C with the valve unit D mounted above and reversed to connect mechanically with those parts necessary for proper operation. I avoid disadvantages of this past arrangement and make it possible to provide an improved valve unit D by locating this valve toward the base of the unit which provides for increased efficiency of operation as will appear hereinafter.

The valve unit D, which is the subject matter of a copending application Serial No. 485,963, filed May 7, 1943, includes a fluid inlet 27 controlled by the valve plunger 28 which employs piston members 29 and 30 connected by the reduced portion 31 of the plunger. The piston members 29 and 30 control the opening and closing of the ports 32 and 33 which open into the passage 34. Thus, when the plunger 28 is raised to open the port 32, in which case port 33 is closed, fluid may flow from the inlet 27 through passageway 34 and to the feed passage 35 via the port 36. The port 36 is controlled by the valve plunger 37 which includes the piston members 38 and 39 connected by the reduced portion 40 of the plunger and in its raised position permits fluid to pass from passageway 34 to feed passageway 35. Thus, in the normal position of the valve fluid flows from the inlet 27 out through the feed passageway 35 to the base of the cylinder 21 and maintains the piston therein in its raised position.

The valve plunger 28 is the normal means of control and by operating it to its raised position, fluid may flow through the valve to the cylinder 21 as described whereas on moving it to its lower position, closing port 32 and opening port 33, the cylinder 21 is vented through the feed passage 35, port 36, passageway 34, port 33 to the discharge outlet 41. The plunger 37 is actuated under emergency conditions and normally is maintained in its raised position as shown. In this position the piston member 39 of this plunger closes the port 42 but in emergency operation if the plunger 37 is caused to be lowered, it will close port 36 and open port 42, thus to vent cylinder 21 to the outlet 41 via the feed passage 35, port 42 and passage 43.

Upper and lower passages 44 and 45 with their connecting parts are incorporated to balance the valve unit at both ends whereas the upper passage 45 connects with a side passage 46 which establishes communication between the upper and lower passages. Preferably the passage 46 is partitioned as at 47 in any suitable way, the partition incorporating a fluid operated check valve 48 so that when the valve is vented to the outlet, the check valve is automatically closed assuring positive discharge of the fluid through the outlet 41 as well as preventing pressure being applied in the upper passages of the valve. This avoids the necessity of employing packing or stuffing boxes in the passage of the plunger rods through the casing which leaves these plunger rods free and eliminates the possibility of sluggish operation or sticking of the plungers during operation which otherwise is sometimes caused by packing. The upward projection of the plunger rods also avoids any fluid pressure by gravity as in the case of the old type of valve with the plunger rods projecting downwardly from the casing. In the valve structure a breather 49 is incorporated to avoid any possibility of air lock.

The rod of plunger 28 is pivotally connected at its upper end with a link 50 which is fulcrumed towards one end at 51 on an arm 52 carried by the shaft 53 which, as shown in Fig. 2, is designed to connect with an operating lever 54 for manual operation. The opposite end of link 50 is pivotally connected by way of the link 55 with the main brake operating lever 17 so that the valve plunger 28 will be operated by the movement of the main lever 17 as well as by the manually operable lever 54.

The plunger rod of plunger 37 pivotally connects with the movable core 56 of the solenoid 57. This solenoid is connected in electrical circuit along with emergency operating mechanism which responds to overspeed or overwind of the hoist. Such a mechanism is well known and need not be illustrated, but may be designated as the well known "Lilly control mechanism." Thus, such mechanism will operate in the case of overspeed or overwind to break the circuit and deenergize solenoid 57 which will also happen in the case of current failure. Consequently, since the solenoid when energized retains valve plunger 37 in its upper position, the result of deenergization will cause the plunger to lower closing port 36 and opening port 42, thus venting cylinder 21 to the outlet 41. Upon venting of cylinder 21, the piston therein will move downwardly under the weights 24, thus applying the brakes to full ON position. On the other hand it is apparent that the brakes may be operated manually by operating lever 54 to depress the valve plunger 23 whereby the inlet 27 is shut off and the cylinder 21 is vented to the discharge outlet 41 via the passage 34.

From the foregoing it is apparent that the brakes of the hoist are readily applied either automatically through the Lilly control mechanism in the case of emergency or in normal course of operation by manual operation, both of which actions are effected through the valve control unit D.

Moreover, the action of plunger 37 may be accelerated and/or made positive if it were to stick or acted sluggishly for any reason by operation of lever 57a, rotating shaft 57b to actuate an accelerating mechanism 57c which forms the subject matter of a copending application. On the other hand, this accelerating mechanism 57c may be operated through a link member 57d connected with an operating lever 57e link connected to the Lilly control mechanism which operates under certain emergencies. This also forms part of the said copending application and need not be described in detail.

In each case of brake application the brakes are applied with the drum coupled to the shaft by means of the clutch 11. It is, of course, absolutely essential that the clutch should not be disengaged from the shaft at any time unless the brakes are in fully applied position. According to the present invention I provide a simple means for positively assuring that the clutch may not be disengaged until the brakes have been applied fully.

The clutch may be disengaged from the driving engagement with the drum by means of a clutch control unit E which includes a thrust cylinder 58 carrying a piston which is actuated from either side by fluid medium controlled by a valve 59. This is connected with the cylinder 58 by means of the ports 60 and 61 which register with the passageways 62 and 63 feeding to either side of the piston in the cylinder. A fluid inlet port 64 introduces fluid to the valve 59 and by means of the valve plunger 65 the flow of the fluid may be directed either through port 60 or port 61 as required. When fluid is directed against one side of the piston to move it, the fluid on the opposite side of the piston is directed through either the port 66 or the port 67 as the case may be according to the setting of the valve plunger 65, through the passageway 68 and connecting passageways 69 and 70 to the outlet 71 which connects with the sump in the case of hydraulic system or with the atmosphere in the case of a pneumatic system. Therefore, through operation of the valve plunger 65 from any suitable source the piston of cylinder 58 may be moved upwardly or downwardly. In such movement it would normally actuate the clutch to engaged or disengaged position by means of a cross-head 72 disposed in the column 73 below the cylinder 58 and connected with the rod of its piston. Upward or downward movement of the cross-head 72 is translated through the lever arms 74 to the shaft 75, which may carry the gear 76 designed to mesh with the gear 77 on shaft 78. At the opposite end of shaft 78 a clutch actuating lever 79 is rigidly secured having a finger designed to enter the grooves of clutch 11. Therefore, if the piston in cylinder 58 is moved upwardly to move the crosshead 72 upwardly the clutch actuating lever 79 will be swung to the right to disengage the clutch.

Figure 3:
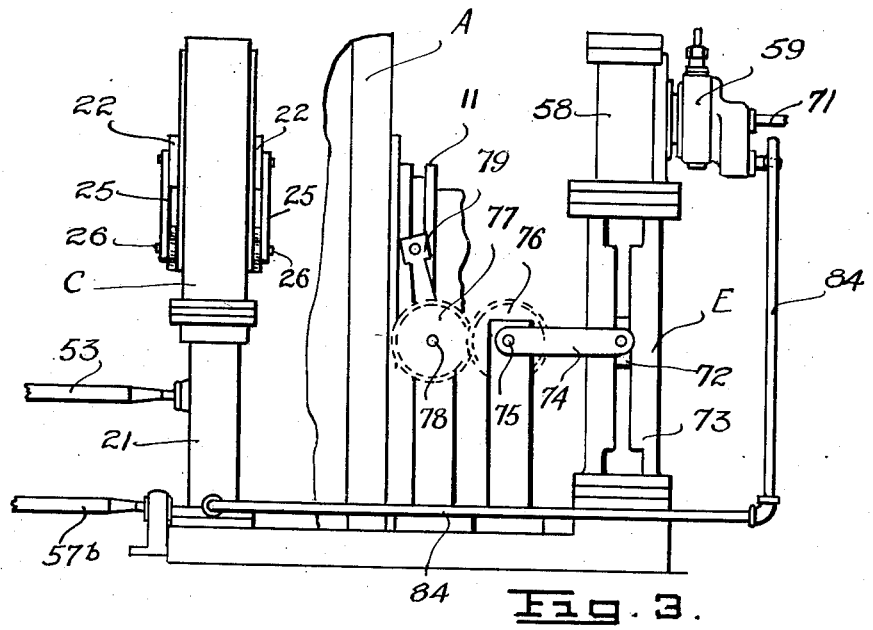
Fig. 3 is a front elevation of the two thrust cylinders and connecting parts with the hoist drum shown fragmentarily.
Figure 4:
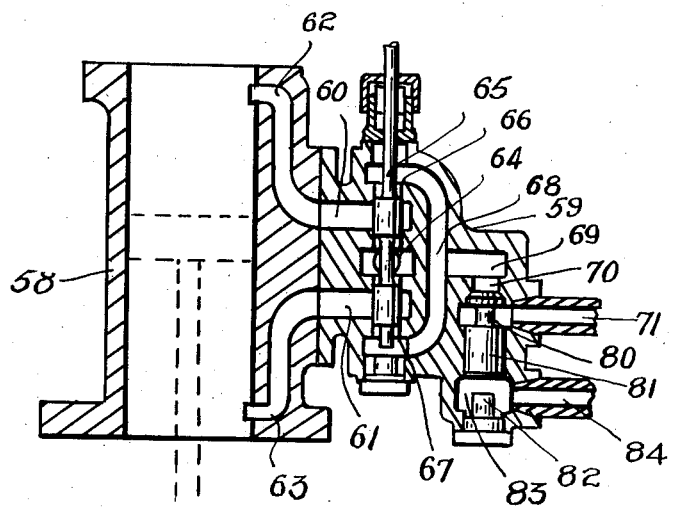
Fig. 4 is a longitudinal section taken through the cylinder and control valve of the second thrust cylinder.
Figure 5:
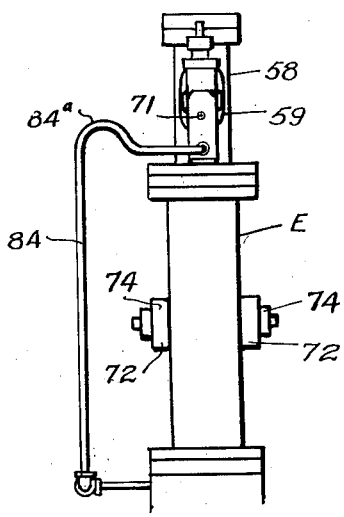
Fig. 5 is a fragmentary end elevation of the top portion of the second thrust cylinder showing the control valve therefor and part of the pipe connection to the other thrust cylinder.
Figure 6:
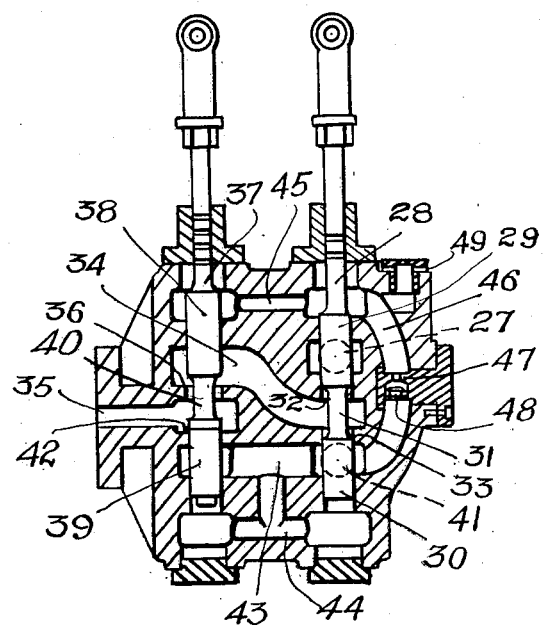
Fig. 6 is a longitudinal section taken through the control valve unit for the first thrust cylinder.

To prevent disengagement of the clutch or, in other words, to render valve 59 completely inoperative until the brakes have been applied to the hoist, I include in the valve structure a check valve 80 which is designed to control the passageway 70 to the outlet 71. The check valve 80 preferably is provided with cylindrical extension 81 providing a gravity operating weight and which is disposed in a bore of the valve and may rest upon a stop member 82 in the chamber 83. This chamber is connected by means of the pipe system 84 with the base of the cylinder 21 of control unit C (Figs. 2, 3 and 5) so that the fluid medium operating the piston in cylinder 21 also passes through the pipe system 84. Therefore, as long as there is fluid pressure in cylinder 21 a fluid pressure will be exerted against the base of the check valve 80 and will retain it in its closed position. This being so the piston in cylinder 58 is definitely locked as there is no outlet through passageway 68 to the outlet 71 which is closed by the check valve 80. Therefore, as long as the brakes are in their released position by reason of the piston in cylinder 21 being raised valve 59 is locked and it is only after the piston in cylinder 21 has moved to its lowermost position and the pressure in the cylinder has been dissipated that the pressure in the pipe system 84 will be relieved to release check valve 80. At this point the brakes of the hoist have been moved to full ON position. As a result, therefore, by simple fluid control the present invention completely eliminates any possibility of the clutch being disengaged prior to full brake application on the hoist drum.

Preferably the pipe system 84 includes an upwardly curved portion 84a which when the pressure is released in this pipe system upon complete lowering of the piston in the thrust cylinder 21 will cause fluid to remain in that section of the pipe system between the curved portion and valve 59. Therefore, substantially instantaneous fluid pressure action is obtained in this pipe system immediately that pressure again obtains in the thrust cylinder 21.

The fluid pressure system with which the thrust cylinder 21 is connected, is, of course, under pressure so that full fluid pressure will be exerted at any time that the control valve unit D is actuated to open the feed inlet passageway 35 to the thrust cylinder 21, the latter being vented to the sump by way of the discharge outlet 41 of valve unit D.

It is apparent that the system is a simple and positive one which in comparison with the prior art eliminates certain of its complications as well as simplifying parts thereof, in addition to providing a positive fluid control of the second thrust cylinder through the first one whereby the latter may only operate elements connected therewith after predetermined operation of the first thrust cylinder.

What I claim as my invention is:

1. Control means for power operated machinery comprising a thrust cylinder, means operatively connecting said thrust cylinder with an element of the power operated machinery, a master control valve unit normally supplying fluid pressure to said thrust cylinder to maintain said element from operation, means for operating said valve to vent said thrust cylinder and operate said element, a second element in connection with said machinery, a thrust cylinder operatively connected with said second element to cause its actuation, a fluid control valve connected with said second thrust cylinder, means for connecting the first thrust cylinder with the second thrust cylinder through the valve of the latter to impose the fluid pressure existing in the first thrust cylinder upon the valve of the second thrust cylinder, and means in connection with said latter valve respondible to said fluid pressure to lock said latter valve from operation thereby maintaining said second element out of operation until the fluid pressure in the first thrust cylinder has been fully released.

2. Control means for power operated machinery comprising a thrust cylinder, means operatively connecting said thrust cylinder with an element of the power operated machinery, a master control valve unit normally supplying fluid pressure to said thrust cylinder to maintain said element from operation, means for operating said valve to vent said thrust cylinder and operate said element, a second element in connection with said machinery, a thrust cylinder operatively connected with said second element to cause its actuation, and fluid pressure means connected between the first thrust cylinder and the second thrust cylinder for locking the latter against operation until the fluid pressure in the first thrust cylinder has been fully released.

3. Control means for power operated machinery as claimed in claim 2 in which the means for locking the second thrust cylinder against operation comprises a fluid control valve connected with the second thrust cylinder having a valve plunger operable to supply fluid to one side of the piston of said cylinder and venting the other side and vice versa, a venting channel in said valve, and a check valve controlling said venting channel and conduit means communicating between said check valve and first thrust cylinder.

4. Control means for power operated machinery including brake mechanism therefor comprising a thrust cylinder, means operatively connecting said thrust cylinder with the brake mechanism of the power operated machinery, a master control valve unit normally supplying fluid pressure to said thrust cylinder to maintain said brake mechanism from operation, means for operating said valve to vent said thrust cylinder and operate said brake mechanism, clutch mechanism in connection with said machinery, a thrust cylinder operatively connected with said clutch mechanism to cause its actuation, and fluid pressure means connected between the first thrust cylinder and the second thrust cylinder for locking the latter against operation until the fluid pressure in the first thrust cylinder has been fully released, whereby said brake mechanism must be applied before said clutch mechanism may be released.

5. Control means for power operated machinery including brake mechanism therefor comprising a thrust cylinder, means operatively connecting said thrust cylinder with the brake mechanism of the power operated machinery, a master control valve unit normally supplying fluid pressure to said thrust cylinder to maintain said brake mechanism from operation, means for operating said valve to vent said thrust cylinder and operate said brake mechanism, clutch mechanism in connection with said machinery, a second thrust cylinder, the latter operatively connected with said clutch mechanism to cause its actuation and including a reciprocable valve to direct the flow of fluid in said second cylinder, an interlocking valve in connection with said second thrust cylinder, means for connecting the first thrust cylinder with the second thrust cylinder through the interlocking valve of the latter to impose the fluid pressure existing in the first thrust cylinder upon the interlocking valve of the second thrust cylinder, said interlocking valve being respondible to said fluid pressure to render the reciprocal valve ineffective thereby maintaining said clutch mechanism out of operation until the fluid pressure in the first thrust cylinder has been fully released.

6. Control means for power operated machinery comprising a pair of thrust cylinders designed respectively to operate an element of said machinery, a fluid control valve connected with one of said cylinders for causing it to operate said cylinder and actuate its element in a predetermined manner, means for operating said valve, an operating valve associated with the second thrust cylinder for actuating its element, means for actuating said latter valve, a fluid connection between the first thrust cylinder and said latter valve including an interlocking valve, said fluid connection imposing pressure conditions on said interlocking valve corresponding to those existing in the first thrust cylinder, said interlocking valve being respondible to the pressure condition in the first thrust cylinder to render the operating valve effective or ineffective whereby the operation of the element connected with the second thrust cylinder is controlled by the operation of the element connected with the first thrust cylinder.

7. In control means for power operated machinery including a pair of thrust cylinders designed each to actuate a given element of said machinery including a control valve connected with one of said thrust cylinders operable only after a predetermined operation of the other thrust cylinder, said valve comprising an inlet and an outlet, feed passageways for supplying fluid pressure to one side or the other side of a thrust cylinder, a valve plunger for regulating the flow of the fluid pressure to the thrust cylinder to supply fluid to one side and to vent the fluid on the other side to the outlet, and valve means between the thrust cylinder and said outlet for shutting off the outlet whereby to lock said thrust cylinder from operation, and fluid connection connecting with said valve and communicating with said valve means for operating the latter, said fluid connection being designed to connect with the other thrust cylinder to subject the latter to the fluid pressure condition of said other thrust cylinder.

MAX T. KNUTZEN.